United States Patent [19]
Anderson

[11] Patent Number: 5,938,368
[45] Date of Patent: Aug. 17, 1999

[54] FASTENING DEVICE INCLUDING A COLLAPSIBLE WASHER

[75] Inventor: Victor R. Anderson, Trumbull, Conn.

[73] Assignee: Loctec Corporation, Newtown, Conn.

[21] Appl. No.: 08/954,651

[22] Filed: Oct. 20, 1997

[51] Int. Cl.⁶ .................................................. B25G 3/28
[52] U.S. Cl. ........................ 403/282; 403/249; 403/260
[58] Field of Search .................... 411/34, 37, 38, 411/549, 547, 60, 313; 403/247, 249, 261, 260, 282

[56] References Cited

U.S. PATENT DOCUMENTS

| | | |
|---|---|---|
| 2,870,493 | 1/1959 | Beyrle . |
| 3,505,921 | 4/1970 | Wigam ........................................ 411/34 |
| 3,888,156 | 6/1975 | Fima ............................................ 411/38 |
| 4,137,198 | 1/1979 | Brown . |
| 4,197,781 | 4/1980 | Giannuzzi ............................... 411/34 X |
| 4,404,709 | 9/1983 | Janz et al. . |
| 4,416,572 | 11/1983 | Black . |
| 4,912,809 | 4/1990 | Scheuer . |
| 5,127,131 | 7/1992 | Corrigan et al. . |
| 5,144,718 | 9/1992 | Ozawa . |
| 5,205,688 | 4/1993 | Sundstrom ................................. 411/38 |
| 5,378,097 | 1/1995 | Barnavol .................................... 411/38 |
| 5,491,993 | 2/1996 | Anderson . |

*Primary Examiner*—Lynne A. Reichard
*Assistant Examiner*—John R. Cottingham
*Attorney, Agent, or Firm*—Melvin I. Stoltz

[57] ABSTRACT

By providing a locking member having collapsible and bendable arm members which cooperate with a head-bearing fastening member, a unique fastening system is achieved which enables hardware products, such as handles, knobs, locks, brackets, and the like to be easily and quickly mounted to any desired furniture product. In the preferred embodiment, the head-bearing fastener and the locking member are constructed to be axially inserted through the mounting holes formed in the furniture product. Then, by mounting the fastening system to the hardware product and inserting the mounted fastening system through the mounting holes, the hardware product is quickly and easily securely affixed in position as the collapsible and foldable arm members of the locking member are forced outwardly into an overall width greater than the mounting holes during the threaded advance of the fastener with the hardware product.

12 Claims, 4 Drawing Sheets

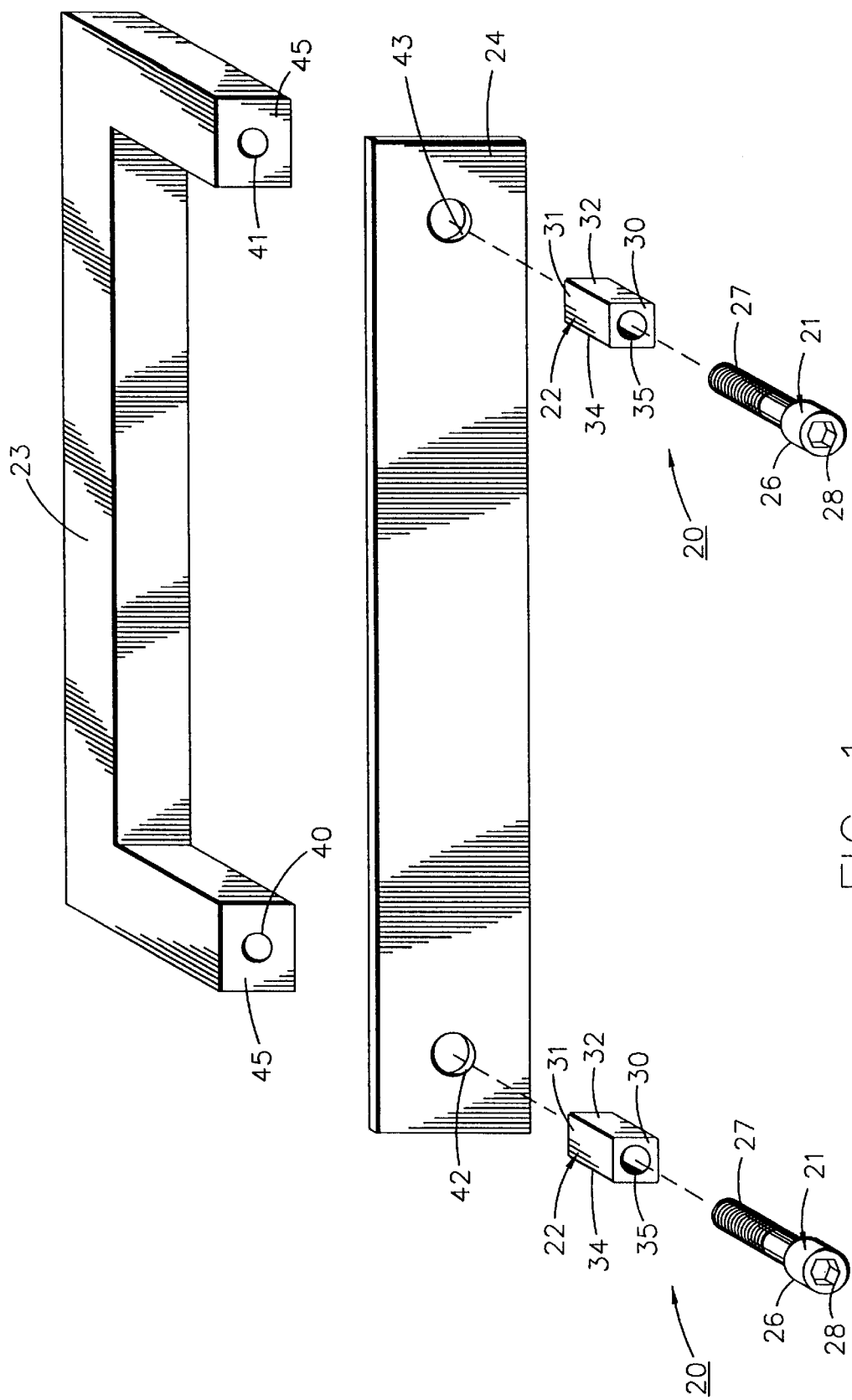

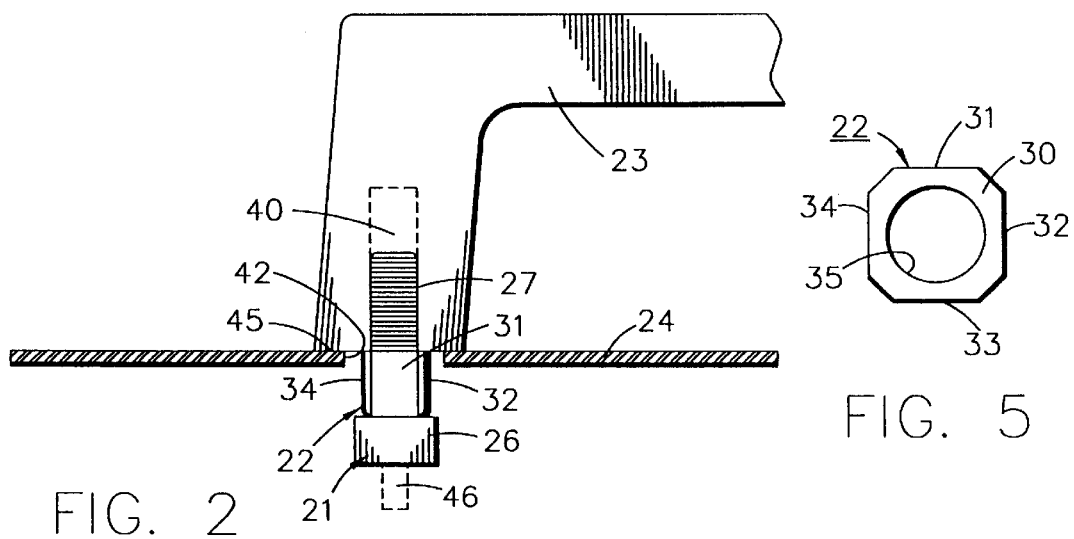
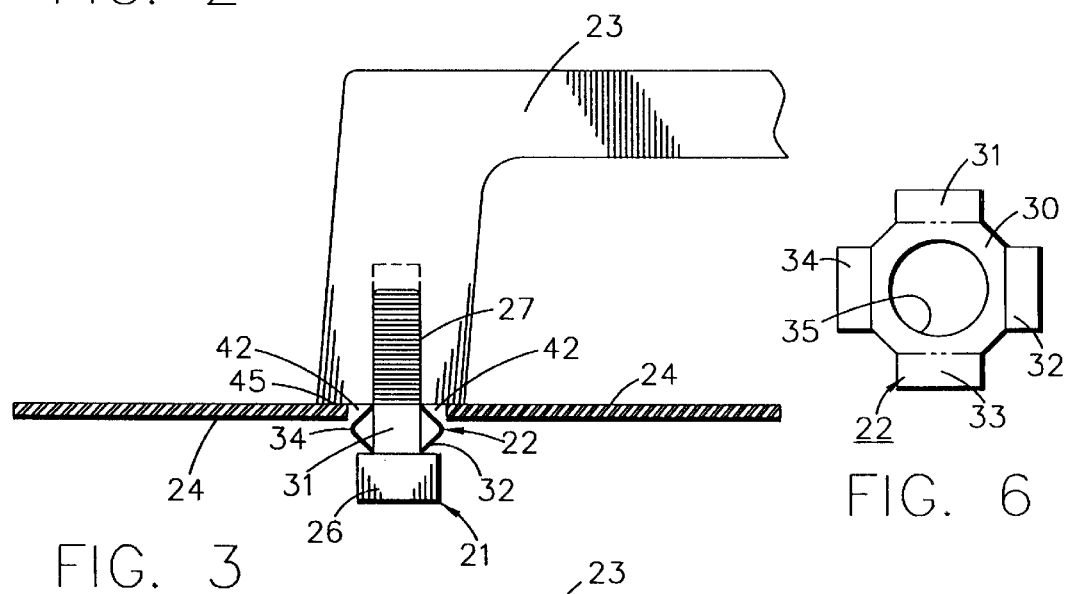
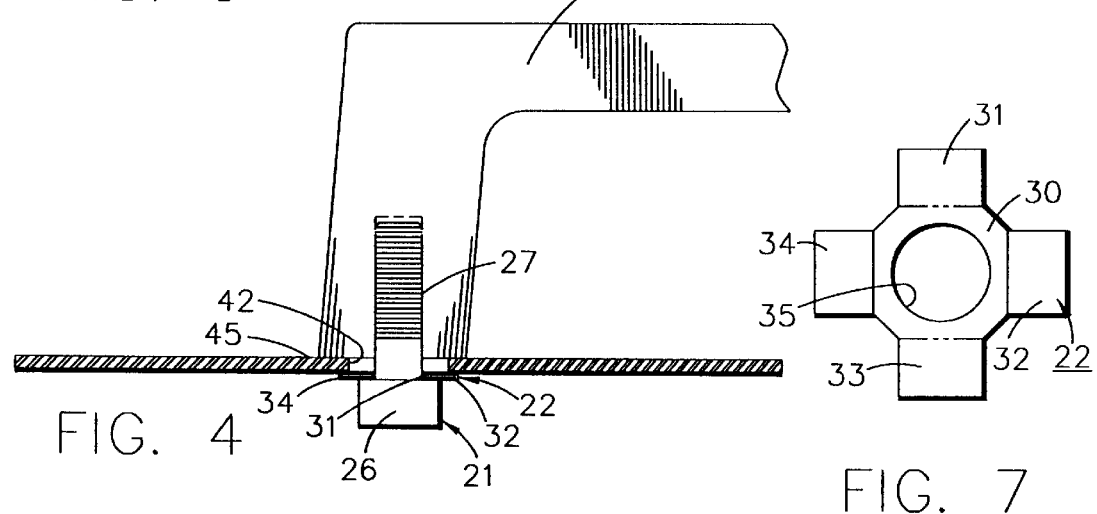

FASTENING DEVICE INCLUDING A COLLAPSIBLE WASHER

TECHNICAL FIELD

This invention relates to fastening systems and, more particularly, rapidly installable fastening systems for use in securely affixing hardware products, such as handles, knobs, locks, and the like.

BACKGROUND OF THE INVENTION

In the mass production of furniture, cabinets, door panels and the like, particularly, office furniture and associated products, the amount of labor required to manufacture and assemble the furniture constitutes a major expense. Consequently, furniture manufacturers are constantly striving to improve assembly techniques in order to reduce the time required for repetitive tasks.

One such repetitive task which is required in the production of most furniture is the installation of handles, pull knobs, locks and the like. In the production of most prior art furniture products, holes are formed in the material from which the furniture is being manufactured. Once a particular area has been fully assembled, such as a drawer or door panel, a handle is fastened to the preformed holes in the associated panel.

In order to achieve this simple task, the desired handle must be placed in overlying relationship with the preformed holes, followed by selection of fastening means, such as screws, which are inserted into the holes from the opposed side of the panel, and into the threaded receiving zones of the handle. Then, the fastening means must be threadedly mounted into the receiving zone formed in both sides of the handle, in order to securely affix the handle to the desired panel. These fastening steps must then be repeated for every other drawer, wall, panel, etc. on which a handle is to be mounted.

In a similar manner, simple pull members are also employed for enabling panel members, such as cabinet doors, to be easily opened and closed. In these instances, the pull knob incorporates a threaded recess zone and is secured to the desired door or panel in substantially the same way, with the knob being aligned with the preformed hole in the door or panel followed by the threaded advancement of screw means into the receiving zone of the pull knob for securely affixing the pull knob to the desired surface.

As is evident from the foregoing, time-consuming, laborious, repetitive action is required for securely mounting handles, knobs, and the like to the desired surface of such products as desks, filing cabinets, wall units, display cabinets, and the like. Furthermore, many of these products for office use are manufactured from sheet metal, while other products are manufactured from a wide variety of materials such as sheet metal, wood, fiberboard, plastic and the like. However, regardless of the materials employed, the fastening systems employed are substantially the same, requiring a substantial labor effort.

Although substantial effort has been expended by manufacturers to reduce the production time required for manufacturing products such as desks, cabinets, file cabinets, display hutches and the like, the ability to reduce the installation time and effort for universally employed fastening systems which securely mount hardware products to a supporting surface has eluded the industry.

Therefore, it is a principal object of the present invention to provide a fastening system which enables for the rapid securement of hardware products such as handles, knobs, locks and the like to a support surface with minimal effort and time.

Another object of the present invention is to provide a fastening system having the characteristic features described above which is capable of being installed by laborers with virtually no training or production skill.

Another object of the present invention is to provide a fastening system having the characteristic features described above which is employable in the production of office furniture products to substantially reduce the time involved in installing hardware such as handles, knobs and the like, thereby substantially reducing the manufacturing costs for such products.

Other and more specific objects will in part be obvious and will in part appear hereinafter.

SUMMARY OF THE INVENTION

By employing the present invention, all of the difficulties and drawbacks found in the prior art have been eliminated and an easily employed, rapidly installed fastening system is achieved. In the present invention, hardware products, such as handles, knobs, locks, and the like are all quickly and easily securely mounted to any desired support surface by mounting a head-bearing fastening member to the threaded receiving zone of the hardware product in combination with a uniquely constructed, collapsible or bendable locking member mounted about the fastening member.

In the preferred construction, the collapsible or bendable locking member comprises a base, having an aperture formed therein for receiving the fastener, and at least two opposed arm members extending outwardly from the base. Preferably, the arm members are positioned in juxtaposed, spaced relationship with each other, extending from the base in a manner which positions said arm members in longitudinally extending, parallel relationship with the axis of the fastener.

In order to obtain rapid, easy, trouble-free affixation of any desired hardware product to a particular support surface, the preferred embodiment of the present invention is constructed with the handle forming component incorporating at least one thread-bearing cavity into which the head-bearing fastener is partially mounted with the collapsible/bendable locking member mounted to the shaft of the head-bearing fastener. By manufacturing and distributing any particular hardware product with the head-bearing fastener and collapsible/bendable locking member mounted thereto, the desired trouble-free, rapid installation and securement of the particular component to the support panel of the furniture is easily achieved.

In order to assure rapid installation, the mounting hole to which the hardware product is being secured must have a diameter which enables both the head-bearing fastener and the collapsible/bendable locking member to pass therethrough. In this way, rapid positioning and secure engagement of the hardware product to the desired panel or surface is achieved.

In order to securely mount the hardware product, such as a handle, knob, lock and the like, to a desired support panel, the hardware product is positioned in the precisely desired location on the support panel with the head-bearing fastener and collapsible/bendable locking member being inserted through the pre-formed holes formed in the support panel. Then, by merely rotating the head-bearing fastener to advance the fastener into further engagement with the hardware product, one edge of each arm member of the collapsible/bendable locking member contacts a surface of the support panel or the hardware product base, while the opposed edge of the arm member and the base of the collapsible/bendable locking member to which the arm members are mounted, directly contacts the head of the fastener. As the threaded engagement of the fastener continues, a compressive force of the head of the fastener acts upon the locking member, causing each of the arm members to expand outwardly, bending and collapsing into a substantially flat component as the threaded advance is completed.

Once the fastener has been fully inserted into the thread-receiving zone in the hardware product, the collapsible/bendable arm members of the locking member are completely deformed with the bendable arm portions thereof being fully collapsed, radially extending outwardly from the base. When in the fully collapsed configuration, the locking member possesses an overall diameter substantially greater than the diameter of through hole in the support panel. As a result, the hardware product is securely mounted to the support panel, incapable of being removed therefrom by pulling due to the secure clamped engagement of the fastener and locking member to one surface of the panel and the hardware product with the other surface of the panel.

By employing the present invention, any desired hardware product is quickly and easily securely affixed to a support panel of any particular product with ease and convenience. In order to achieve this result, the hardware product, a handle, knob, lock, or the like, along with the fastening means and locking member mounted thereto, are placed in the desired position in the mounting holes of the panel. When properly positioned, the hardware product is mounted on one side of the panel and the fastener and locking member extending from the mounting holes on the other side of the panel. Then, by merely rotating the fasteners attached to the hardware product, the fastener advances into engagement with the hardware product, while the locking member collapses and expands outwardly, thereby completing the assembly thereof. When completed, the handle, knob, lock, or the like is secured to the desired surface in the precisely desired location in a simple, quick, easily attained manner.

In an alternate embodiment, wherein a handle is to be mounted to a support panel, a hook member is used on one end of the handle instead of one of the fasteners. In this embodiment, the hook member is constructed for being inserted through one hole formed in the support panel and locked in place by a notch formed with the hook member. The head-bearing fastener and locking member, detailed above, is mounted to the free end of the handle and is inserted through the second hole of the panel. Once in position, the fastener is rotated, as detailed above, causing the locking member to collapse and deform into the fully extended lock configuration, securely mounting the handle to the desired support panel in an easily attained manner.

The invention accordingly comprises an article of manufacture possessing the features, properties, and relation of elements which will be exemplified in the article hereinafter described and the scope of the invention will be indicated in the claims.

THE DRAWINGS

For a fuller understanding of the nature and objects of the invention, reference should be had to the following detailed description, taken in connection with the accompanying drawings, in which:

FIG. 1 is an exploded perspective view depicting the fastening system of the present invention in conjunction with a handle and support panel;

FIGS. 2–4 are side elevation views, partially broken away, and partially in cross-section, depicting various stages in the affixation of the handle to the support panel by employing the fastening system of the present invention;

Figure 8:
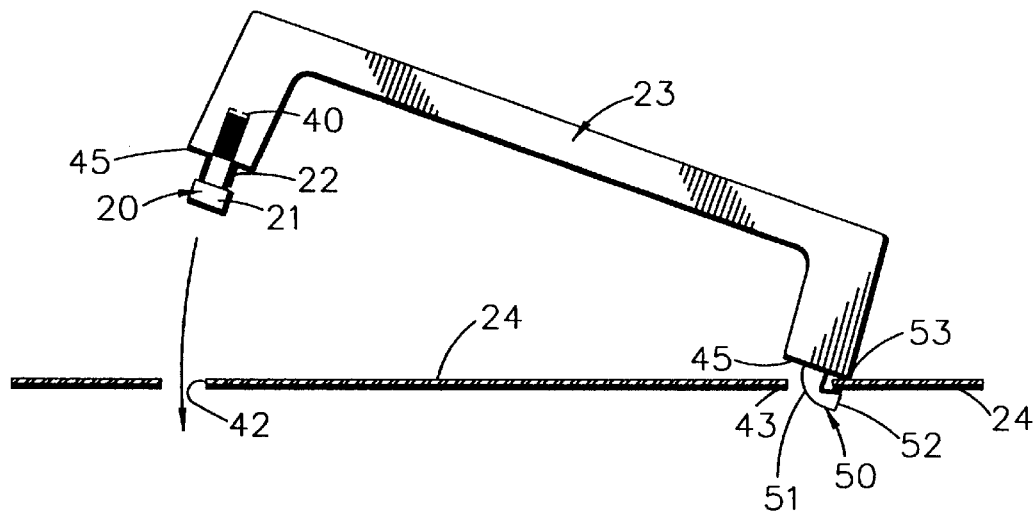

FIGS. 5–7 are top plan views, greatly enlarged, depicting the collapsible/bendable, locking member of the fastening system of the present invention in its alternate stages during the installation process; and FIGS. 8–11 are side elevation views, partially in cross-section, depicting the fastening system of the present invention in various stages of assembly for affixing an alternate embodiment of a hardware product to a support panel.

DETAILED DISCLOSURE

By referring to FIGS. 1–11, along with the following detailed discussion, the construction and operation of the fastening system of the present invention can best be understood along with its ability to quickly install and securely affix various embodiments of a hardware product to a support panel. In this disclosure, the hardware product is depicted as a handle member and the support panel is depicted as the wall of a drawer manufactured from sheet metal. However, it is to be understood that the handle and drawer panel are merely depicted for exemplary purposes only and that any hardware product, including knobs, locks, brackets, and the like, can be employed in a substantially identical manner and can be affixed to any support member using the teaching of this invention. Consequently, it is to be understood that these figures and following detailed disclosure are provided for exemplary purposes only and are not intended to limit the present invention in any way.

In FIG. 1, fastening system 20 is depicted as comprising head-bearing, threaded fastener 21 and collapsible/bendable locking member 22, both constructed for cooperating and securely mounting handle member 23 to support panel 24. In this embodiment, fastener 21 comprises a head 26 integrally connected to threaded shaft 27. In addition, head 26 incorporates drive engaging aperture 28 constructed for receiving a suitable drive member to cause fastener 21 to be rotated about the central axis thereof.

The preferred construction of collapsible/bendable locking member 22 comprises a support base or ring 30 and longitudinally extending, cooperating arm members 31, 32, 33, and 34. As depicted in FIG. 1 and as further discussed below, longitudinally extending arm members 31, 32, 33, and 34 are integrally mounted to support base 30 at the proximal ends thereof and extend independently therefrom in juxtaposed, spaced, cooperating relationship with each other.

In the preferred construction, arm members 31, 32, 33, and 34 are initially positioned as depicted in FIG. 1, longitudinally extending in a plane substantially parallel to the central axis of elongated, longitudinally extending threaded shaft 27 of head-bearing fastener 21. In addition, each arm member 31, 32, 33, and 34 is formed from substantially flat metal material, such as sheet metal, and comprises a generally rectangular shape mounted on one edge to base 30 with the remaining three edges comprising free edges.

Furthermore, support base 30 incorporates aperture or hole 35 formed therein which comprises a diameter greater than the diameter of shaft 27. In this way, the collapsible/bendable locking member can be easily positioned on threaded shaft 27, cooperatively associated therewith as well as with head 26.

In order to enable handle 23 to be mounted to support panel 24, handle 23 incorporates a substantially flat base or mounting surface 45 and threaded holes 40 and 41 formed in base 45. In addition, support panel 24 incorporates mounting holes 42 and 43 formed in support panel 24 spaced apart from each other a distance substantially equal to the distance between holes 40 and 41 of handles 23. By employing this construction, along with the threaded engagement of fastening system 20 in holes 40 and 41 of handle 23, the rapid, easily achieved, secure mounted engagement of handle 23 to support panel 24 is easily attained.

In order to employ the present invention, collapsible/bendable locking member 20 is mounted on threaded shaft 27 of fastener 21 and threaded shaft 27 is mounted in partial threaded engagement in hole 40 of handle 23. Similarly, a second fastening system 20 is assembled in the manner detailed above and partially threaded into engagement in hole 41 of handle 23. Once a pair of fastening systems 20, 20 have been mounted to handle 23, handle 23 is ready to be quickly and easily affixed to support panel 24.

In employing the present invention, it is anticipated that handle 23 would be manufactured and distributed incorporating fastening systems 20 mounted in appropriate threaded apertures thereof. In this way, all preassembly paneling of the components forming fastening system 20 are completed in advance and individuals manufacturing the actual furniture product need not assemble the small components during the furniture construction process. Of course, if desired, fastening system 20 of the present invention can be distributed to manufacturers in component form. However, preassembly of the entire handle member ready for installation on any desired surface of the furniture product is preferred.

In order to securely affix handle 23 to support panel 24, fastening system 20 in threaded hole 40 and fastening system 20 in threaded hole 41 are aligned with apertures 42 and 43 of support panel 24 and merely advanced through apertures 42 and 43 until the base surface 45 of handle 23 is brought into contact with one side of support panel 24. When in this position, fastening systems 20, 20 extend through holes 42 and 43 of support panel 24, outwardly extending therefrom on the opposed side of panel 24. This position is depicted in FIG. 2.

In affixing handle member 23 to support panel 24, the installer merely places an appropriate tool 46, shown in phantom in FIG. 2, into drive engaging aperture 28 of head 26 of fastener 21. Then, by rotating tool 46 in order to cause head-bearing fastener 21 to rotate therewith, threaded shaft 27 is advanced into engagement with aperture 40 of handle 23. As depicted in FIG. 2, the first stage in the affixation process is reached when the distal end of longitudinally extending arm members 31, 32, 33, and 34 pass through aperture 42 of support panels 24 and is brought into contact with base 45 of handle 23. The configuration of locking member 22 in this first position is also shown in FIG. 5.

By further rotating head-bearing fastener 21 into further engagement in threaded hole 40 of handle 23, each longitudinally extending arm member 31, 32, 33, and 34 is sandwiched between base 45 of handle 23 and lower surface of head 26 of fastener 21. As the rotation continues, increased compressive forces are imposed upon longitudinally extending arm members 31, 32, 33, and 34, causing the arm members to collapse or bend outwardly as the compression force exceeds the inherent resistant force of the material forming locking member 22. This outward collapse or bending action is depicted in FIGS. 3 and 6.

The compressive forces continue to act on locking member 22, causing each arm member 31, 32, 33, and 34 to be folded or bent further, until head-bearing fastener 21 is brought into substantially complete interengagement with threaded hole 40 of handle 23, and longitudinally extending arm members 31, 32, 33, and 34 are completely collapsed or bent upon themselves, sandwiched between head 26 of fastener 21 and one surface of panel 24. This final position is depicted in FIGS. 4 and 7.

As is evident from FIGS. 4 and 7, when collapsible/bendable locking member 22 is fully collapsed, as shown in FIGS. 4 and 7, each of the arm members 31, 32, 33, and 34 extend outwardly from base 30, establishing an overall width for locking member 22 which exceeds the diameter of aperture 42. As a result, handle 23 is securely affixed in position, abutting aperture 42 on one side of panel 24 with base 45 while locking member 22 and head-bearing fastener 21 abut the opposed surface of panel 24. In this way, handle 23 is securely mounted to panel 24, ready for use.

As is evident to one of ordinary skill in the art, this identical affixation process is employed for fastening system 20 in order to securely mount the opposed side of handle 23 to support panel 24 in mounting hole 43. Once completed, handle 23 is securely mounted to panel 24, ready for use.

In the construction of locking member 22, any suitable material can be used. Although metal is preferred, other materials such as plastics may also be used. The only requirement for the material employed is the flexibility or bendability needed to enable each arm member to flexibly bend in response to compressive forces in a manner which enables the arm members to controllably yield while outwardly flexing and bending until each arm member is fully folded upon itself. When in its fully compressed, folded position, the locking member spans the mounting hole of the panel, enabling the head-bearing fastening member to securely retain the handle in the desired position.

In order to assure that controlled outward bending movement is attained, arm portions 31, 32, 33, and 34 can be constructed using various construction techniques. Although not exhaustive of all construction methods, arm portions 31, 32, 33, and 34 may be constructed using such techniques as pre-bent arm portions, score lines formed in each arm portion, notches, and tapered or slanted arm portions. By employing these methods, or other similar methods, the desired outward, controlled bending of each arm portion is assured in response to the application of the compressive forces by the fastening member.

By referring to FIGS. 8–11, along with the following detailed discussion, the construction and operation of an alternate embodiment for handle 23 employing fastening system 20 of the present invention can best be understood. In this embodiment, as detailed above, handle 23 is constructed for being quickly and easily securely affixed to support panel 24 in direct association with apertures 42 and 43 formed in panel 24. Handle 23 incorporates substantially flat bases 45, 45 which are constructed for mounting engagement with one surface of support panel 24. However, in this embodiment, handle 23 comprises a hook member 50 mounted to one end surface 45 of handle 23 in order to securely affix that end of handle 23 to panel 24.

As detailed below, hook member 50 is constructed for being quickly and easily inserted into aperture 43 of support panel 24 for secure retention therein. Then, once hook member 50 is securely mounted in aperture 43 of panel 24, the opposed end of handle 23, with fastening system 20 mounted in threaded hole 40 formed in the opposed end surface 45 of handle 23, is arcuately pivoted and placed into aligned, telescopic interengagement with aperture 42 of support panel 24. Once in this position, fastening system 20 is securely affixed to support panel 24 in the manner detailed above.

In the preferred embodiment, hook member 50 comprises an overall "J" shape formed by a central post 51 mounted to surface 45 substantially perpendicularly therewith an a radially extending finger member 52 mounted to the distal end of central post 51 extending away from the opposed end of handle 23. By employing this configuration, slot 53 is formed between finger member 52 and surface 45.

In order to enable hook member 50 to be employed in the desired manner, hook member 50 is constructed comprising overall dimensions which enable hook member 50, in its entirety, to be inserted through aperture 43 of support plate 24. In this way, the rapid, easy locked engagement of hook member 50 with support panel 43 is easily achieved.

In employing this embodiment of the present invention, handle 23 is securely mounted to support panel 24 quickly, easily, and with minimal effort, by first inserting hook member 50 into aperture 43 of support panel 44 until hook member 50 has extended through aperture 43 as depicted in FIG. 8. Once in this position, hook member 50 is mounted in interengagement with support panel 24 by inserting a portion of support panel 24 in slot 53 between finger member 52 and surface 45 of handle 23.

Figure 9:
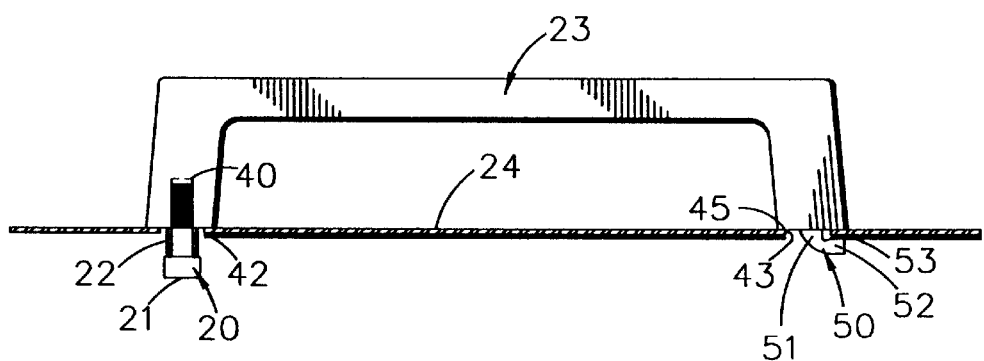

Once the secure mounted engagement of hook member 50 of handle 23 with panel 24 is completed, the opposed end of handle 23 is arcuately pivoted to align fastening system 20 with aperture 42 of support panel 24 and telescopically extend fastening system 20 through aperture 42, as depicted in FIGS. 8 and 9. When in the fully engaged position, base 45 of handle 23 to which fastening system 20 is mounted is in secure, abutting, contact with one surface of support panel 24, while fastening system 20 extends through aperture 42.

Figure 10:
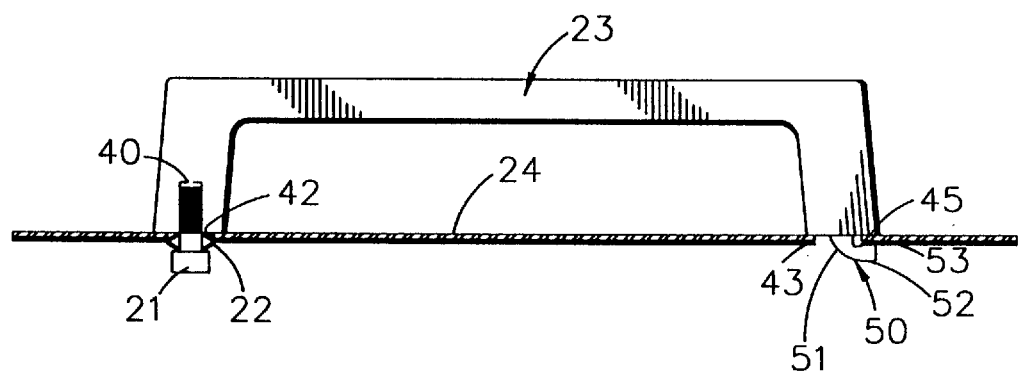
Figure 11:
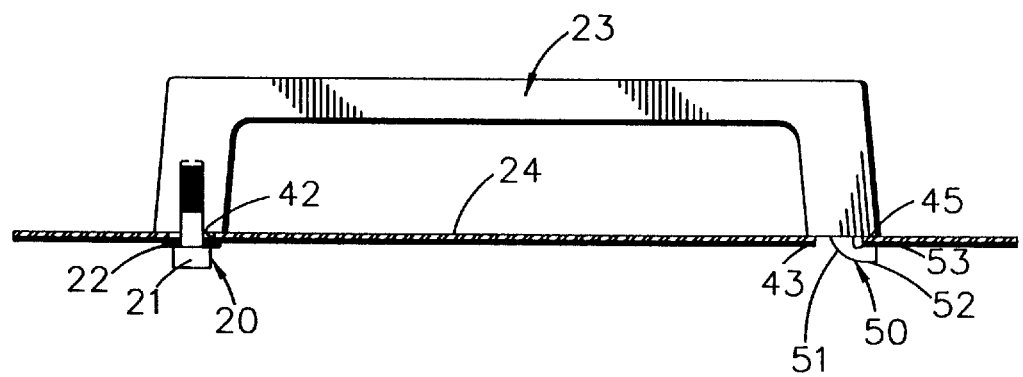

Next, fastening system 20 is employed for securely mounting handle 23 to support panel 24 quickly and easily with minimum labor effort. As detailed above, suitable drive means are mounted to head 28 of head bearing fastener 21, causing head-bearing fastener 21 to be rotated about its central axis relative to handle 23, advancing head bearing fastener 21 into further threaded engagement with threaded hole 40 of handle 23. As shown in FIGS. 9, 10, and 11, as well as fully detailed below, the threaded advance of head-bearing fastener 21 into hole 40 of handle 23 causes head 26 of fastener 21, in cooperation with surface 45 of handle 23, to contact and impose a compressive force upon arm members 31, 32, 33, and 34. The continuous rotational advance of fastener 21 causes arm members 31, 32, 33, and 34 of collapsible/bendable locking member 22 to be continuously, longitudinally compressed between head 28 and surface 45.

When this force overcomes the inherent structural resistance provided by arm members 31, 32, 33, and 34 of locking member 22, each arm member bows and bends outwardly, yielding to the forces imposed thereon by the rotational advance of head-bearing fastener 21 into handle 23. As these forces continue, arm members 31, 32, 33, and 34 continue to bendingly deform outwardly until the arm members have been independently folded substantially in half upon itself. When in this final position, the overall diameter established by locking member 22 exceeds the diameter of aperture 40 of support panel 24, thereby securely affixing handle 23 and head-bearing fastener 21 to panel 24, preventing removal of handle 23 from panel 24. In this way, the secure, easily attained, rapid installation of handle 23 to panel 24 is attained.

As is apparent from the foregoing detailed disclosure, by employing either of the alternate embodiments of the present invention, any hardware product can be quickly and easily mounted to any desired furniture product by employing fastening system 20 of the present invention. By merely advancing fastening system 20 through a desired mounting hole and then threadedly engaging fastening system 20 with the hardware product, the associated arm members of locking member 22 are forced to expand outwardly as part of the installation process, due to the compression forces imposed thereon.

By employing this system, a locking member is created in place which possesses an effective overall diameter greater than the diameter of the aperture through which it had previously, easily passed through. As a result, the hardware product is securely affixed to the desired supporting panel of the furniture product in a rapidly installed, easily attained manner, reducing both installation time as well as need for any installation expertise.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An integrated system for enabling the rapid, easy installation of any hardware product to any desired support panel in association with at least one mounting hole formed in said support panel, said system comprising:

A. a hardware product constructed for cooperating with the support panel and comprising
  a. a base portion constructed for contacting the support panel in association with the mounting hole thereof, and
  b. a threaded hole formed in said hardware product in association with the base portion thereof, and B. a fastening assembly cooperatively associated with the hardware product and comprising
  a. a fastening member comprising
    1. an elongated shaft incorporating a threaded zone formed thereon and a first end threadedly engaged in the threaded hole of the hardware product, and
    2. a head member mounted to a second end of the shaft in substantial co-axial alignment therewith and comprising an overall width greater than the width of the shaft and less than the diameter of the mounting hole of the support panel; and
  b. a locking member comprising
    1. a base portion incorporating an aperture formed therein, enabling said base to be mounted about the shaft of the fastening member and freely movable relative thereto between the head member and the base portion of the hardware product,
    2. at least two elongated arm members, each of said arm members being mounted at one end thereof to the base portion and extending therefrom in juxtaposed, spaced, substantially parallel relationship to each other;
    3. each arm member being positioned in cooperative alignment with the axis of the shaft of the fastening member, defining an overall width with the base portion which is less than the diameter of the mounting hole of the support panel; and 4. said elongated arm members being formed from bendable material for causing said arm members to foldably bend outwardly in response to compressive forces imposed by the head member and the base portion of the hardware product acting at opposed ends on said arm members by the rotational advance of the fastening member into threaded engagement with the hardware product;

whereby the application of sufficient compressive force causes the arm members to foldably collapse outwardly, extending from the base portion and defining therewith an overall width greater than the diameter of the mounting holes, effectively enabling the fastening member to securely affix the hardware product to the desired support panel.

2. The integrated system defined in claim 1, wherein the elongated shaft of the fastening member is further defined as comprising a cylindrical shape and said head member incorporates a driver engaging cavity formed in a surface thereof for enabling a user to easily engage the fastening member and impart rotational movement thereto.

3. The integrated system defined in claim 2, wherein the arms of the locking member prior to deformation are further defined as extending from the base portion in a plane, substantially parallel to the central axis of the elongated shaft of the fastening system.

4. The integrated system defined in claim 3, wherein said base portion of the locking member is further defined as comprising a width less than the diameter of the head member of the fastening member.

5. The integrated system defined in claim 4, wherein said locking member is further defined as comprising four separate and independent arm members formed from substantially thin, flat material and comprising a substantially flat planar shape, effectively peripherally surrounding the elongated shaft of said fastening member.

6. The integrated system defined in claim 1, wherein said system is further defined as being constructed for enabling the fastening member to be inserted through the mounting hole of the support panel until the base portion of the hardware product abuts a surface of the support panel, with the head member and locking member of the fastening member extending outwardly from the mounting holes, enabling the head member of the fastening member to be easily accessed for being rotationally driven into engagement with the hardware product.

7. The integrated system defined in claim 6, wherein the locking member is further defined as being movable from a first configuration wherein the overall width thereof is less than the diameter of the mounting holes of the support panel to a second configuration wherein the overall width of the locking member is greater than the diameter of the mounting holes, said second configuration being formed in response to the threaded advance of the fastening member into the threaded hole of the hardware product and the imposition of compressive forces on the arm members of the locking member by the rotational, threaded, engagement of the fastening member with the hardware product.

8. The integrated system defined in claim 7, wherein said locking member is further defined as comprising four separate and independent arm members formed from substantially thin, flat material, and comprising flat, planar shapes, effectively peripherally surrounding the elongated shaft of the fastening member.

9. The integrated system defined in claim 7, wherein said arm members of the locking member are further defined as being constructed for foldably bending outwardly in response to the application of compressive forces thereto.

10. The integrated system defined in claim 9, wherein each of said arm members folds outwardly substantially midway along its length, forming two segments of substantially equal length.

11. The integrated system defined in claim 1, wherein said hardware product is further defined as comprising a substantially U-shaped handle having a first terminating end incorporating the base portion and the threaded hole, and a second terminating end comprising a hook member extending outwardly therefrom.

12. The integrated system defined in claim 11, wherein said hook member is further defined as comprising a J-shaped construction for being received and retained in a mounting hole formed in the supporting panel.

* * * * *